J. A. CARLSON.
BAND SAW.
APPLICATION FILED SEPT. 13, 1915.
1,230,275.
Patented June 19, 1917.
2 SHEETS—SHEET 2.
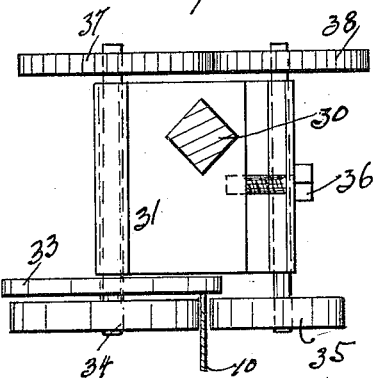
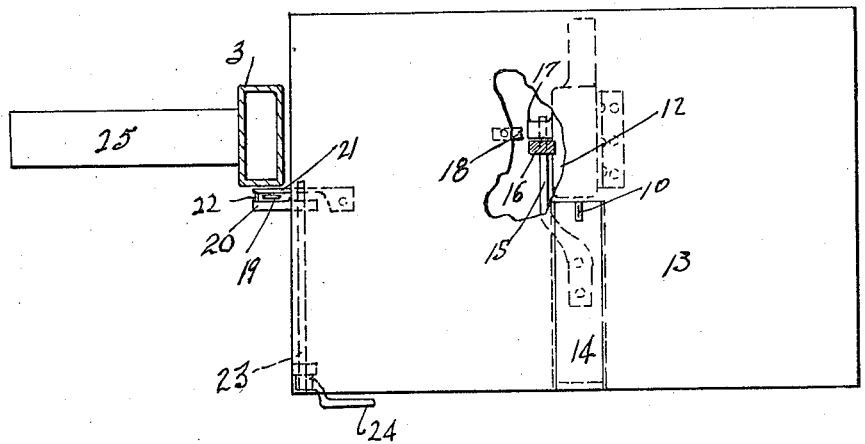
WITNESS
Frank N. Fowler
INVENTOR
John A Carlson
BY
Fred P. Gorin
ATTORNEY

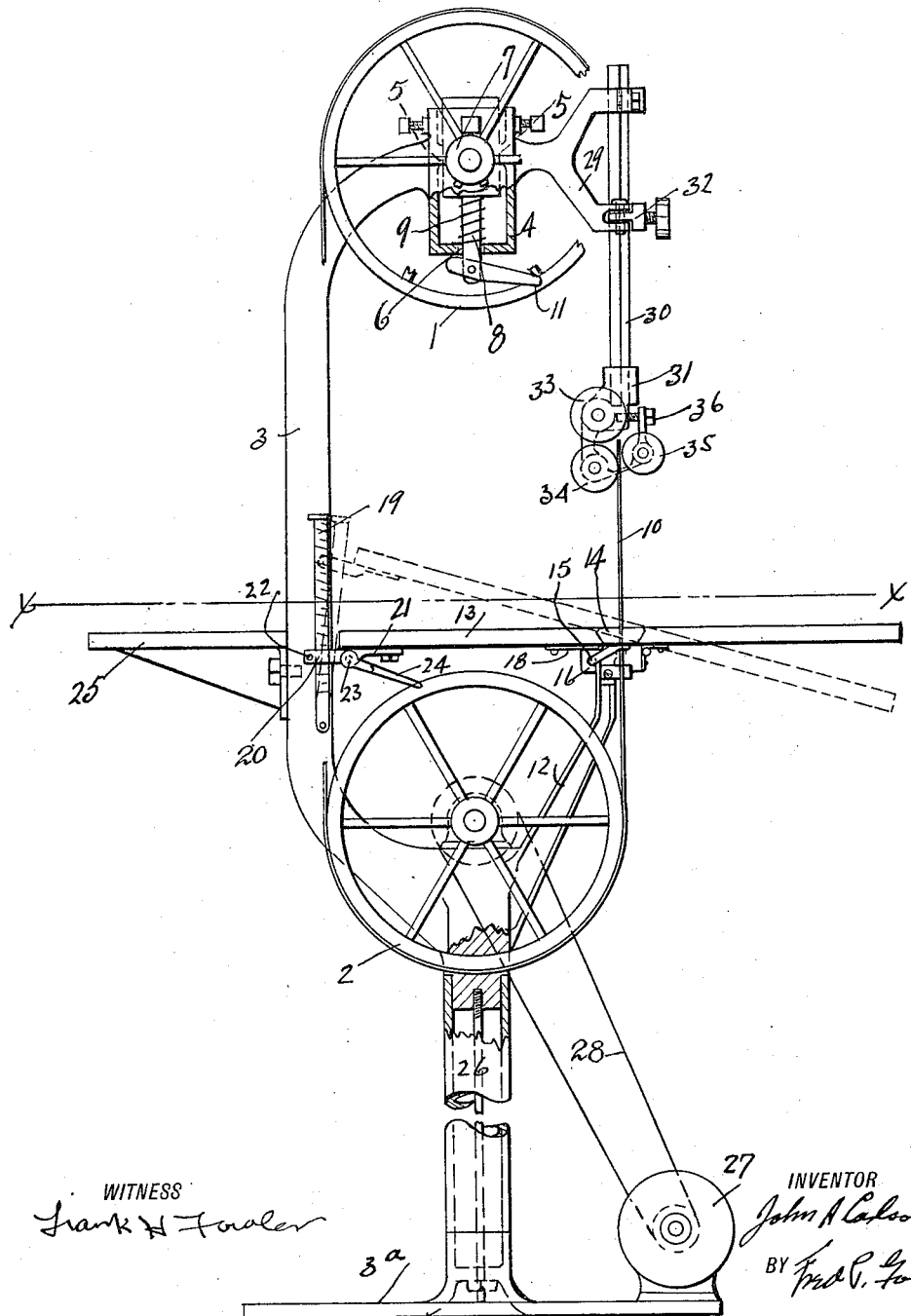

UNITED STATES PATENT OFFICE.

JOHN A. CARLSON, OF SEATTLE, WASHINGTON.

BAND-SAW.

1,230,275.

Specification of Letters Patent.  Patented June 19, 1917.

Application filed September 13, 1915. Serial No. 50,532.

*To all whom it may concern:*

Be it known that I, JOHN A. CARLSON, a citizen of the United States, and a resident of Seattle, in the county of King and State of Washington, have invented certain new and useful Improvements in Band-Saws, of which the following is a full, true, and exact specification.

My invention relates to improvements in band saws and has for its principal object to generally improve upon and simplify and cheapen the construction of a device of this character; to provide band saws which are applicable as a bench tool for pattern makers and the like; to provide simple and efficient indicating and locking means by which the position of the tilting table of a band saw is indicated in so far as whether it be level or set at an angle and by which the said table can be locked in a level position only.

A further object is to provide a direct reading scale for accurate setting of the tilting table at an angle; to provide an improved saw guide. As is well known in the art, a band saw is quite essential in a pattern shop and usually one or more large machines are used to which each man takes his work to be sawed. An object of my device is to furnish a small and simple band saw, yet efficient and large enough for most work, which may be furnished one to each pattern maker.

Other objects will appear as my invention is more fully explained in the following specification, illustrated in the accompanying drawings and pointed out in the appended claim.

In the drawings, Figure 1 is a side elevation of my device with parts broken away. Fig. 2 is a part plan on line X—X of Fig. 1 with parts broken away. Fig. 3 is an enlarged detail plan of my improved saw guide.

Referring more particularly to the drawings, numerals 1 and 2 indicate upper and lower saw wheels respectively, which are mounted in suitable bearings in a frame 3. The upper wheel 1 has a self tightening head which includes an outer boxing 4 which is integral with frame 3 and which is internally cored and provided with oppositely disposed guide lugs 5. Boxing 4 is open at the top and closed at the bottom except for an opening 6. A bearing 7 for the upper wheel 1 is mounted within the core of boxing 4 and is provided with an extension pin 8 which projects downwardly through opening 6. A coiled spring 9 is interposed between bearing 7 and the bottom of the housing around the pin 8 in such a way as to thrust the said bearing upwardly. A saw 10 encircles the wheels 1 and 2 and is kept tight by the thrust of the spring 9. A cam lever 11 on the end of pin 8 is used to draw downwardly the bearing 7 when it is desired to release saw 10 from the wheels 1 and 2. An extension 12 of frame 5 supports a tilting table 13 which is hinged to the said frame member. Saw 10 passes through table 13 and is removed and replaced by removing a gate 14 in table 13. When gate 14 is as shown in Figs. 1 and 2, the table 13 is in a horizontal position and is so locked by means of a bar 15, attached to gate 14, which passes through lugs 16 and 17, the former on the bottom of table 13 and the latter on frame 12. When it is desired to tilt table 13, the gate 14 is pulled out until the rod 15 disengages the lug 17 which operation unlocks the said table. A leaf spring 18, which is secured to the under side of table 13, is positioned so as to rest upon the top of lug 17 when the table is horizontal and as the table is tilted to spring down opposite the hole in lug 16 so as to prevent bar 15 from being shoved forward. It is thus seen that the gate 14 cannot be completely closed except when the table is in a horizontal position thereby indicating the position of said table. The partial withdrawal of gate 13 allows an increased space for the saw 10 while in a tilted position. An indicating scale 19 is pivoted at its lower end to frame 3 and passes freely between a lug 20 which is integral with table 13 and a clamp lever 21 which is pivoted to said table. A loose pin 22 retains the scale 19 between the said lug and lever. A clamp screw 23 passes through lug 20, is threaded into lever 21 and is provided with a hand lever 24 on its outer end. The turning of hand lever 24 draws lever 21 toward lug 20 so as to clamp the scale 19 between said lug and lever, thereby holding the table 13 at the position set with respect to the said scale. A rest 25 is secured to frame 3. The base 3ª of frame 3 is fitted with an extensible lug 26 which may be removed when the device is to be fastened to a bench. A motor 27 is fastened to base 3ª and is used to drive the saw wheel 2 by means of belt 28. An extension arm 29 on frame 3 adjustably supports a spindle 30 to the lower end of which is secured a saw guide frame 31. A hinged clamp 32 holds spindle 30 in any desired position with respect to the arm 29. The saw guide includes an antifriction wheel 33 and side guide wheels 34 and 35, one on either side of saw 10. That part of frame 31 which supports wheels 33 and 34 is rigid while that part which supports wheel 35 is yielding with respect to the balance of the frame so as to form a means of adjusting the spacing of wheels 34 and 35. A screw 36 is used to make said adjustments. The wheels 33 and 35 are geared together by gears 37 and 38 in such a way as to cause them to both roll against the surface of the saw 10.

While I have shown a particular form of embodiment of my invention, I am aware that many minor changes therein will readily suggest themselves to others skilled in the art without departing from the form and scope of the invention, and I therefore desire to avoid being limited to the exact form shown and described except as pointed out in the appended claim.

Having described my invention, what I claim as new and desire to protect by Letters Patent, is—

In a device of the class described, the combination of a hinged tilting table, self indicating locking means for securing the said table in a horizontal position and for indicating whether said table be in said horizontal position or at an angle thereto, said means including a sliding gate in said table, a bar secured to the under side of said gate and adapted to coöperate when said table is in a horizontal position with registering holes in lugs, one of said lugs being integral with the table and the other with a table supporting frame, a spring which automatically prevents the closing of said gate when the said table is in an angular position with respect to the horizontal.

JOHN A. CARLSON.